April 28, 1936.　　　　S. OLSON　　　　2,038,803
DISHWASHER
Filed April 23, 1932　　2 Sheets-Sheet 1
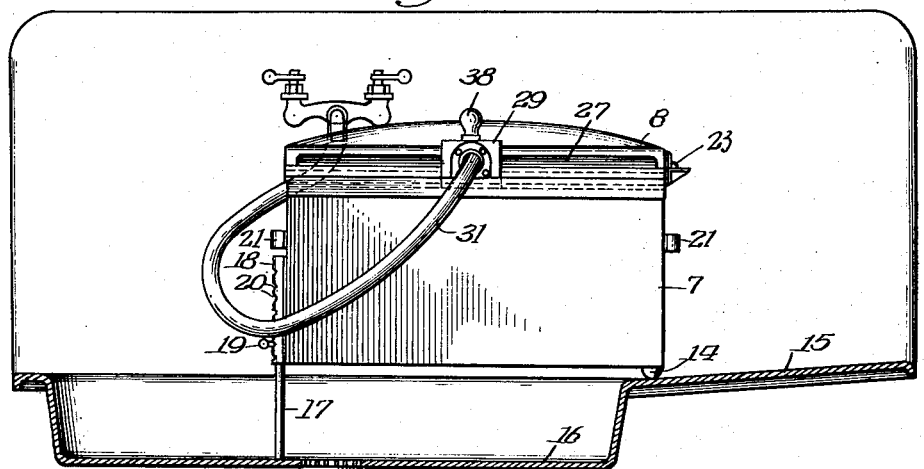
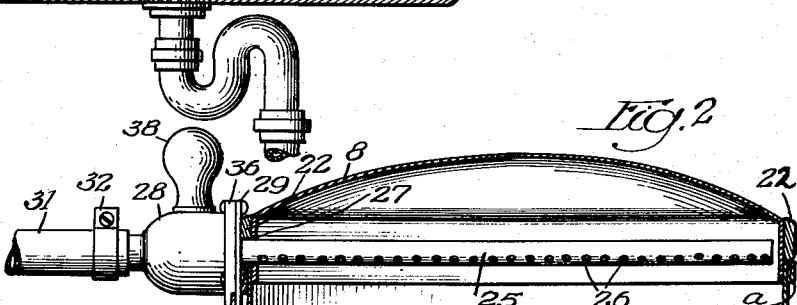
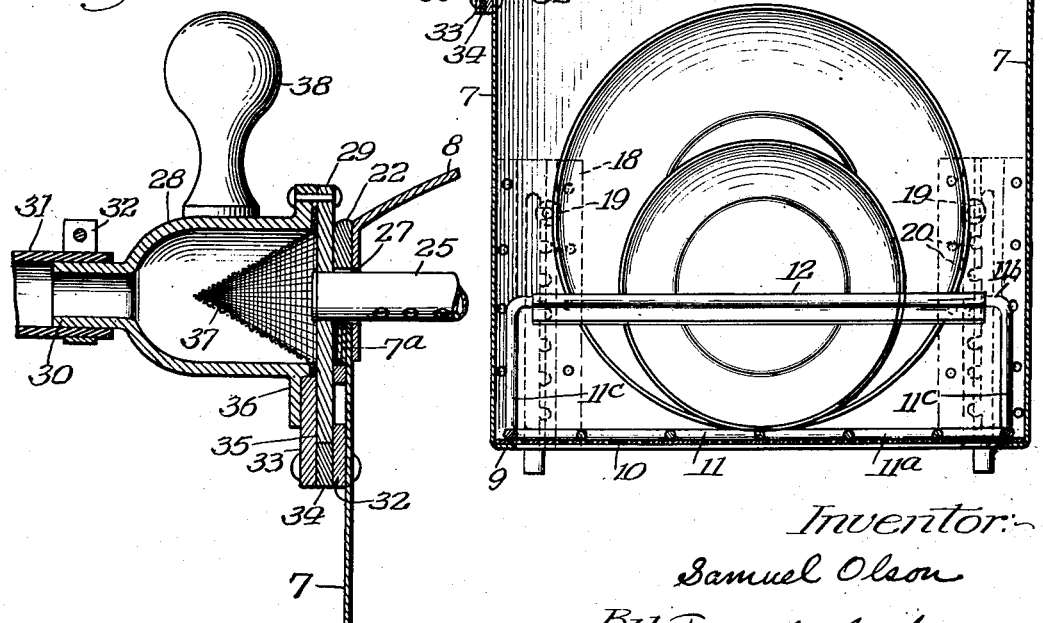
Inventor:—
Samuel Olson
By Fred Gerlach
his Atty

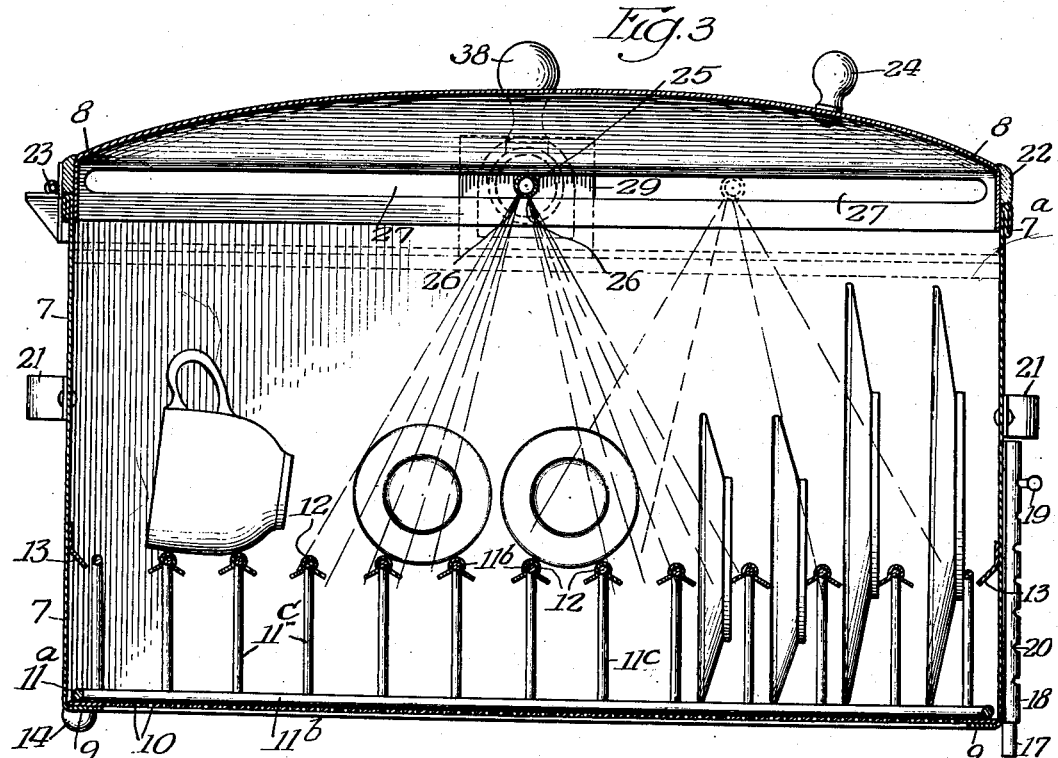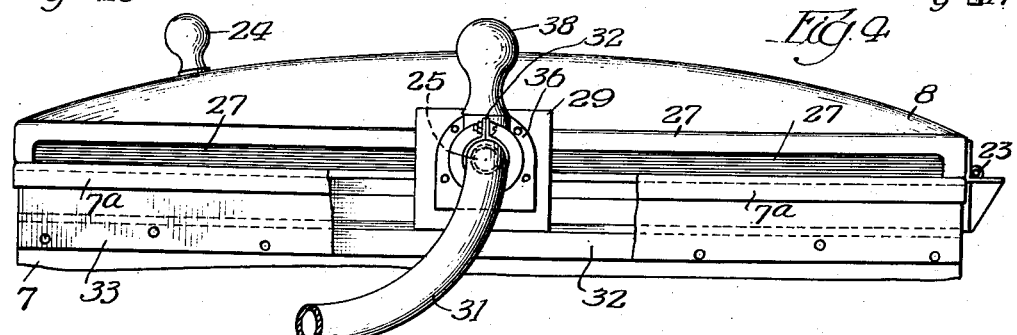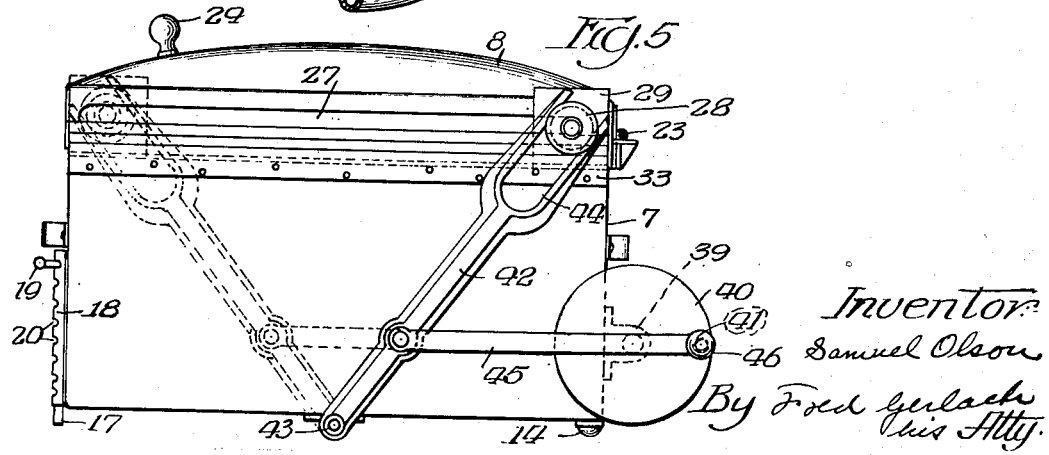

Patented Apr. 28, 1936

2,038,803

UNITED STATES PATENT OFFICE 2,038,803

DISHWASHER

Samuel Olson, Oak Park, Ill.

Application April 23, 1932, Serial No. 607,017

11 Claims. (Cl. 141—9)

The invention relates to dish washers.

One object of the invention is to provide a dish washer which is simple in construction and efficient in operation. Another object of the invention is to provide an improved dish washer which comprises a receptacle adapted to be placed into position to drain into an ordinary kitchen sink and which is provided with a spray pipe which is movable over the dishes in the receptacle, so that the dishes adjacent the bottom of the receptacle can be thoroughly cleansed. Other objects of the invention will appear from the detailed description.

The invention consists in the several novel features hereinafter set forth and more particularly defined by claims at the conclusion hereof.

In the drawings: Fig. 1 is a front elevation of a dish-washer embodying the invention in operative position over a sink. Fig. 2 is a transverse section of the dish washer. Fig. 2ᵃ is a section of the casing connected to the spray-pipe and the tank therefor. Fig. 3 is a longitudinal section of the dish washer. Fig. 4 is a front elevation of the upper portion of the washer. Fig. 5 is a side elevation illustrating the dish washer equipped with mechanism for shifting the spray pipe from end to end of the receptacle.

The dish washer which forms the subject matter of the invention comprises a substantially rectangular receptacle which consists of a sheet metal body 7 with an open top to provide access to the inside of the receptacle, and a removable top cover 8. The body 7 is provided at its bottom with an inturned flange 9 for supporting a plate 10 and a dish rack 11. The plate 10 is perforated to permit the water to drain from the receptacle and is adapted to catch the coarse material washed from the dishes. The plate 10 may be dispensed with when it is desired to discharge the material washed from dishes directly into a sink 16. The dish rack 11 may be of any suitable construction which is adapted to hold dishes of different shapes apart so the surfaces thereof will be reached by a spray. The rack, as illustrated, comprises a lower marginal frame 11ᵃ, longitudinal rods or bars 11ᵇ, and transverse arches 11ᶜ of wires, all secured together to form a rigid structure upon and between which dishes of different shapes may be held. Deflector plates 12 are secured to the top members of arches 11ᶜ and have flanges which diverge downwardly and laterally to deflect the water against the surfaces of the dishes between the arches. Deflector plates 13 are secured to the end walls of the body 7 for a similar purpose. For convenience in cleaning, the rack 11 is removably supported in the receptacle, so that racks of different shapes, according to the character of the dishes to be washed, may be substituted in the receptacle. At one of its ends, the body 7 of the receptacle is provided with feet 14 which are adapted to rest, as shown in Fig. 1, on the drain table 15 of the sink 16, while the remaining portion of the receptacle may extend over the sink so the water therefrom will drain directly into the sink. To support the end of the receptacle which extends over the sink 16, the receptacle is provided with a pair of legs 17 which are slidable vertically in sockets 18. The latter are secured in any suitable manner to the receptacle. The legs are slidable in vertical slots in the sockets 18 and adapted to coact notches 20 in the sockets 18 to support the adjacent end of the receptacle at any desired elevation over the sink 16. By providing these extensible legs which may be locked in different positions, the legs are adapted to support the receptacle in sinks of different depths. When the legs are locked in their uppermost position, they will be positioned so the receptacle may rest in a horizontal position on the floor or other available support. The receptacle is portable so it can be placed over the sink when it is to be used for washing dishes, and removed to a convenient place of storage when it is not in use. Handles 21 are secured to the ends of the receptacle so it can be conveniently carried about.

The upper rim of the body 7 of the receptacle is folded or lapped upon itself, as at 7ᵃ, to provide a reinforced edge. The cover 8 comprises a curved top with a depending flange adapted to extend into the body 7 and a reinforcing bar 22 secured to the outer face of the flange. This bar is adapted to engage or rest upon the reinforced upper edge of the body 7. At one of its ends the cover is connected by a hinge 23 to the body 7 so that it and the parts carried thereby may be swung upwardly away from the receptacle in order to provide access to the interior of the body and thus permit the dishes to be placed in, and removed from, the rack 11. A handle 24 is secured to the cover 8. A pipe 25 provided with two longitudinal series of perforations or jet openings 26, extends through a horizontal slot 27 in one side of the cover 8, across the receptacle, and terminates inside thereof and adjacent the opposite side of the cover. The perforations 26 are formed to deliver divergent sprays of water from the pipe to the dishes. The perforations or jet openings of one longitudinal series are inclined downwardly and outwardly towards one end of the receptacle at approximately an angle of 22½° as shown in Figure 3 of the drawings serve to jet water against the front faces of the dishes on the rack 11. The perforations or jet openings 26 of the other longitudinal series are inclined downwardly and outwardly toward the other end of the receptacle at approximately an angle of 22½° and operate during spray of water from the pipe 25 to spray water downwardly and outwardly in jet form against the back faces of the dishes. The spray pipe is bodily movable substantially from end to end of the receptacle. By moving the spray pipe from end to end of the receptacle, water will be discharged thoroughly to cleanse substantially all the surfaces on the dishes in or on the rack 11. The divergent sprays produced by perforations 26 are effective in washing the vertical surfaces of the dishes, so that when the spray pipe is moved longitudinally of the receptacle, the dishes will be thoroughly cleansed. When the spray pipe is moved sidewise in one direction the streams of water from the perforations or jet openings of one series in the pipe 25, strike against the bottom portions of the dishes and progressively work upwardly, and when the pipe is moved sidewise in the other direction the aforesaid streams of water strike against the top portions of the dishes and work progressively downwards. It is therefore apparent that the streams of water from one set of openings alternately work upwards and downwards across the front faces of the dishes during reciprocation of the pipe 25 and the streams of water from the other series of perforations or jet openings work alternately upwards and downwards across the back faces of the dishes. The outer end of the spray pipe 25 is secured to a casing which comprises a body 28, and a plate 29 at one end thereof. The other end of said casing is provided with a nipple 30 to which is removably connected by a clamp 32, a flexible pipe or hose 31 which extends and is connected to the faucet which usually discharges into the sink. A track for slidably supporting the spray pipe and the casing, to which it is connected, is secured to the body 7 of the receptacle and comprises an inner bar 32 and an outer bar 33 and an intermediate bar 34 which form a channel 35 in which the lower portion of plate 29 is fitted to slide horizontally. A flange 36 on casing 28 laps the outer face of bar 33 so that the spray pipe will be supported vertically and against rocking movement in the receptacle. Casing 28 is adapted to receive soap or cleaning powder, and a conical screen 37 is provided in said casing for retarding the soap until it is dissolved in the water passing through the casing 28 and into the spray pipe 25. The soap may be inserted into the casing when the hose is disconnected therefrom or it may be inserted in the hose before it is connected to the casing. An upwardly extending handle 38 is secured to the casing 28, so that the user can, by grasping the handle, reciprocate the spray pipe 25 from end to end of the receptacle and over the dishes while the sprays are being discharged from the spray pipe over and onto the dishes in the receptacle.

In some instances it may be desirable to provide mechanism for conveniently shifting the spray pipe by means of a crank, and such mechanism is illustrated in Fig. 5. In this construction a shaft 39 is mounted in bearings on one end of the receptacle 7 and is provided with a wheel 40 to which is connected a wrist pin 41. An arm 42 is pivoted to the central portion of one side of the receptacle, and is provided at its upper end with a fork 44 which straddles the casing 28, to which the spray pipe is connected. A link 45 connects the arm 42 and the wrist pin 41. A crank handle 46 is secured to pin 41 on the shaft 35. When the shaft 39 is rotated, the link 45 through arm 42 will reciprocate the spray pipe from end to end of the receptacle as the result of the turning of said crank.

The invention exemplifies a dish washer which is simple in construction, and which will efficiently cleanse the dishes by the back-and-forth manipulation of the spray pipe; also one which can be conveniently placed over a kitchen sink, so it will drain into an ordinary sink, and can be stored when it is not in use.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a dish washer of the character described, the combination of an elongated portable receptacle comprising an open top body with a bottom opening for water draining purposes and a removable cover for closing the top of the body, a rack in the lower portion of the body for holding dishes in a substantially vertical position, a horizontal spray pipe extending transversely across the upper portion of the receptacle and having a longitudinal series of jet openings for discharging or spraying water downwardly onto the dishes on the rack, a horizontally extending track on one of the side walls of the body, a guide applied to one end of the pipe and coacting with the track so as to support the pipe so that it is movable sidewise back and forth over the dishes for spraying purposes, and a flexible connection for supplying water to the spray pipe.

2. In a dish washer of the character described, the combination of an elongated portable receptacle comprising an open top body with a bottom opening for water draining purposes and a removable cover for the top of the body, a rack in the lower portion of the body for supporting dishes in substantially vertical positions, a horizontal spray-pipe extending transversely across the upper portion of the receptacle and provided with jet openings for discharging water downwardly onto the dishes on the rack, a soap retaining casing connected to one end of the spray-pipe, a horizontal track on the side of the receptacle-body adjacent the casing and over which the casing is slidable so the pipe may be shifted sidewise in a horizontal plane over the dishes for spraying purposes, and a flexible connection for supplying water to the casing for discharge into the pipe.

3. In a dish washer of the character described, the combination of a receptacle adapted to be placed over a sink and having a bottom opening for the drainage of water therefrom, a rack in the lower portion of the receptacle for holding dishes in substantially a vertical position and one in front of the other, a horizontal spray pipe across the upper portion of the receptacle having one end thereof projecting outside of the receptacle and provided with a longitudinal series of jet openings for discharging water downwardly against the dishes on the rack, means applied to said one end of the pipe for supporting the pipe so that it is movable sideways in a substantially horizontal plane over the dishes, a flexible connection for supplying water to the spray pipe, and power-driven means for moving the spray pipe back and forth over the dishes for washing purposes comprising an arm disposed on the outside of the receptacle and having one end thereof pivoted and its other end forked and applied to said one end of the spray pipe.

4. In a dish washer of the character described, the combination of a portable receptacle comprising an open top body with a bottom opening for the drainage of water directly therefrom and a removable cover for the top of the body, a rack in the lower portion of the body for supporting dishes, a spray pipe for the dishes connected to the cover so that it is removable therewith to provide unrestricted access to the interior of the body and having means associated therewith whereby when the cover is in its closed position on the body it is movable back and forth in substantially a horizontal plane over the dishes, said means including a horizontal track on the body and a coacting guide member mounted on the pipe and slidable on the track and a flexible connection for supplying water to the spray pipe.

5. In a dish washer of the character described, the combination of an elongated receptacle comprising an open top body with a bottom opening for the drainage of water therefrom and a removable cover for the top of the body having a depending rim with a longitudinally extending slot in the rim, a rack in the lower portion of the body for supporting dishes, a spray pipe for the dishes disposed crosswise beneath the cover and so that one end thereof projects through the slot in the rim of the cover and provided with supporting means whereby it is movable from one end of the receptacle to the other in substantially a horizontal plane over the dishes when the cover is in its operative position on the body and is removable with the cover in order to provide unrestricted access to the interior of the body upon removal of the cover, and a flexible connection for supplying water to the spray pipe.

6. In a dish washer of the character described, the combination of an elongated receptacle comprising an open top body with a bottom opening for the drainage of water directly therefrom and a removable cover for the top of the body having a depending rim with a longitudinally extending slot in the rim, a rack in the lower portion of the body for supporting dishes, a spray pipe for the dishes disposed crosswise beneath the cover and with one end thereof projecting out through the slot in the rim of the cover and removable with the cover in order to provide unrestricted access to the interior of the body upon removal of the cover, interfitting means between said one end of the pipe and the body for supporting and guiding the pipe when the cover is in place so that the pipe is movable from one end of the receptacle to the other in substantially a horizontal plane over the dishes, and a flexible connection applied to said one end of the spray pipe and for supplying water to the pipe for dish-spraying purposes.

7. In a dish washer of the character described, the combination of a receptacle having a bottom opening for the drainage of water therefrom, a horizontally movable pipe in the upper portion of the receptacle for spraying water downwardly, and rack means in the bottom portion of the receptacle designed to support dishes one in front of the other and substantially in vertical positions under the spray means, and including a series of laterally spaced deflectors adapted to extend transversely between the dishes and embodying downwardly extending divergent flange portions for deflecting water from the pipe sidewise against the dishes.

8. In a dish washer of the character described, the combination of a receptacle having a bottom opening for the drainage of water therefrom, a horizontal, laterally movable pipe in the upper portion of the receptacle adapted for connection to a source of water supply and provided with a longitudinal series of openings for jetting water downwardly towards the bottom of the receptacle, and a rack in the bottom portion of the receptacle adapted to support dishes one in front of the other and in substantially vertical positions and comprising a series of horizontally extending rods adapted to extend transversely between and separate the dishes and having applied thereto downwardly extending diverging flange portions for deflecting outwardly against the faces of the dishes the jets of water discharged downwardly by the spray pipe.

9. In a dish washer of the character described, the combination of a receptacle adapted to be placed over a sink and embodying a part having a horizontally extending slot, a rack disposed in the receptacle beneath the slot and provided with means for holding dishes in a substantially vertical position and so that they are disposed one in front of the other and transversely with respect to the slot, a horizontal spray-pipe having one end thereof extending through said slot, means for supporting the pipe so that it is sidewise shiftable back and forth in a horizontal plane, comprising a horizontal track underlying the slot and a coacting guide member on said one end of the pipe and slidable on the track, said pipe having a longitudinal series of jet openings which are inclined downwardly and outwardly in one direction and serve to jet streams of water so that during sidewise shift of the pipe in one direction they sweep from bottom to top across certain faces of the dishes and during sidewise shift of the pipe in the other direction they sweep from top to bottom across said certain faces of the dishes, said spray-pipe also having a longitudinal series of jet openings which are inclined downwardly and outwardly oppositely to the jet openings of the first mentioned series and serve to jet streams of water so that during sidewise shift of the pipe in said one direction they sweep from top to bottom across other faces of the dishes and during sidewise shift of the pipe in said other direction they sweep from bottom to top across said other faces of the dishes, a flexible connection for supplying water to said one end of the spray-pipe, and means forming a bottom opening for the receptacle for permitting water in the receptacle to drain therefrom.

10. In a dish washer of the character described, the combination of a polygonal receptacle adapted to be placed over a sink and consisting of an open top body part with a bottom opening for water draining purposes and a removable cover part for closing the top of the body part, one of said parts of the receptacle having a horizontal slot in one of the side portions thereof, a rack disposed in the receptacle and provided with means for holding and supporting dishes, a horizontal spray pipe with jet openings for discharging water against the dishes on the rack, extending across the receptacle and having one end thereof extending through the aforesaid slot, means for supporting the pipe so that it is sidewise movable back and forth in a horizontal plane for dish spraying purposes, comprising a horizontal track underlying the slot and a coacting guide member connected to said one end of the pipe and slidable on the track, and a flexible connection for supplying water to the spray-pipe.

11. In a dish washer of the character described, the combination of an elongated receptacle adapted to be placed over a sink and comprising a body with an open top and a removable cover for closing the top of the body, said body having a continuous inwardly extending bottom flange on the lower margins of the sides and ends thereof defining an opening for the bottom of the body through which water is permitted to drain to the sink, a rack for holding dishes in an upstanding position supported on the aforementioned flange and removable through the top of the body upon removal of the cover, a horizontal spray-pipe provided with jet openings for discharging water downwardly onto the dishes on the rack, means associated with the cover for supporting the pipe so that it is removable with the cover and is also shiftable sidewise in substantially a horizontal plane over the dishes for dish spraying purposes when the cover is in place on top of the body of the receptacle, and a flexible connection for supplying water to the spray-pipe.

SAMUEL OLSON.